(12) United States Patent
Futami et al.

(10) Patent No.: US 6,948,417 B2
(45) Date of Patent: Sep. 27, 2005

(54) FLUID CYLINDER WITH SWIVEL JOINT

(75) Inventors: Tatsuya Futami, Kohriyama (JP);
Yoshiaki Yamamoto, Kohriyama (JP);
Kenji Kanemaru, Kohriyama (JP);
Masatake Tamaru, Tatsunokuchi-machi (JP)

(73) Assignees: Komatsu Ltd. (JP); Komatsu Zenoah Co. (JP)

( * ) Notice: Subject to any disclaimer, the term of this patent is extended or adjusted under 35 U.S.C. 154(b) by 23 days.

(21) Appl. No.: 10/134,752

(22) Filed: Apr. 30, 2002

(65) Prior Publication Data
US 2002/0162449 A1 Nov. 7, 2002

(30) Foreign Application Priority Data
May 7, 2001 (JP) .................................... 2001-135800

(51) Int. Cl.[7] .............................................. F01B 31/00
(52) U.S. Cl. ................. 92/86; 92/113; 92/119
(58) Field of Search ...................... 92/86, 110, 111, 92/113, 119; 60/455

(56) References Cited

U.S. PATENT DOCUMENTS

| | | | | |
|---|---|---|---|---|
| 2,293,167 A | * | 8/1942 | Overbeke ..................... | 92/119 |
| 2,936,086 A | * | 5/1960 | Pueschner et al. ............ | 92/119 |
| 3,293,994 A | * | 12/1966 | Napolitano .................... | 92/86 |
| 3,399,786 A | * | 9/1968 | Honeycutt ..................... | 92/119 |
| 6,257,122 B1 | * | 7/2001 | Michler et al. ................ | 92/86 |

FOREIGN PATENT DOCUMENTS

JP        1-148105        10/1989

\* cited by examiner

*Primary Examiner*—F. Daniel Lopez
(74) *Attorney, Agent, or Firm*—Rader, Fishman & Grauer PLLC (57) ABSTRACT

A fluid cylinder with a swivel joint which is more improved with high utility is provided. To this end, in the fluid cylinder, a flow passage (R2b) leading to a chamber (1F) at the rod side of the cylinder is provided inside a rod (3), and a pin hole (3H) in a rod front end portion (3F) and a pin (P1) fitted in the pin hole (3H) are formed into a swivel joint so that the flow passage (R2b) is always guided to an outside even if the pin hole (3H) and the pin (P1) are relatively rotated.

20 Claims, 5 Drawing Sheets

FLUID CYLINDER WITH SWIVEL JOINT

TECHNICAL FIELD

The present invention relates to a fluid cylinder with a swivel joint.

BACKGROUND ART

As the rare usage of a fluid cylinder, there is the usage in which the fluid cylinder is provided between a member movably placed on, for example, a linear rail and a fixed member fixed outside the rail, and the member is moved on the rail by extension and contraction of the cylinder. In this usage, the cylinder extends and contracts, but its posture does not change.

On the other hand, in the usage frequently adopted, a pin hole in which the pin provided at another member is fitted is included in at least one of a rod front end portion and a tube rear end portion of the cylinder, and a tube (specifically, the cylinder itself) is relatively rotated around the pin during extension and contraction of the cylinder. In this usage, the posture of the cylinder changes during extension and contraction of the cylinder. In view of this usage, Japanese Utility Model Laid-open No. 1-148105 proposes a fluid cylinder with a swivel joint.

Summing it up, the art of the above-described Utility Model is "a double acting type and single rod type of fluid cylinder comprising a first opening in a pin outer circumferential surface, a second opening in a pin hole inner circumferential surface, which always opposes to the first opening even when a tube relatively rotates around the pin, a first flow passage leading from the first opening to a third opening provided in a pin end surface, a second flow passage leading from the second opening into the tube, and a swivel flow passage with which the first and second flow passages normally communicate via the first and second openings even when the tube relatively rotates around the pin, wherein the pin comprising said first and third openings and the first flow passage is the pin fitted in the pin hole in a rear end portion of a tube, said second opening is provided in an entire circumference of the pin hole inner circumferential surface, and a flow passage, which leads to a chamber at a side opposite a rod in the tube, of said second flow passage is provided in a tube rear portion, while a flow passage, which leads to a chamber at a rod side in the tube, of the second flow passage is provided by being connected with a pipe, which is extensively provided along a tube outer circumferential surface through holes provided in a front and rear portions of the tube".

Incidentally, taking a hydraulic shovel being one of, for example, construction equipment frequently using fluid cylinders as an example, this equipment is frequently operated in cities and the like to say nothing of the operation on an uneven ground such as a mountain and forest, wasteland and the like. Accordingly, even though it is construction equipment, excellent appearance is demanded. Each hydraulic cylinder of a hydraulic shovel operates in a direction of specific normal load. Accordingly, if the art of the above-described Utility Model is adopted as it is, the following disadvantages occur.

(1) In the art of the above-described Utility Model, "the flow passage, which leads to the chamber at the rod side in the tube, of the second flow passage is provided by being connected with a pipe, which is extensively provided along the tube outer circumferential surface through holes provided in a front and rear portions of the tube". Therefore, the pipe becomes an exposed object and projected object from a vehicle body to thereby impair the outer appearance. At the time of operations of dismantling structures in cities, various kinds of operations on an uneven ground and the like, it is feared that the projected object being the pipe collides against dismantled objects, branches, stones and rocks and the like to bring about non-operated vehicles with an unexpected trouble such as oil leakage.

(2) As for the manner in which the pin is fitted in the pin hole, they are strongly pressed to be in close contact with each other at a load side, and a gap occurs at a side opposite the load. However, in the art of the above-described Utility Model, "the second opening is provided in the entire circumference of the pin hole inner circumferential surface". As a result, the following first and second disadvantages occur.

The first disadvantage is that as the operating time increases, the sliding surfaces of the pin and pin hole are worn, and when rattling occurs in the manner of fitting thereafter, a gap, at the side opposite the load, of the expanded gap causing the rattling makes it easy to directly leak oil to an outside from the second opening provided in the entire circumference of the pin hole inner circumferential surface.

The second disadvantage is caused by the fact that the hydraulic cylinder is composed of the flow passage leading to the chamber at the side opposite the rod in the tube and the flow passage leading to the chamber at the rod side. Specifically, both the second openings provided in the entire circumference of the pin hole inner circumferential surface cause both the flow passages to communicate with each other by the gap at the side opposite the load of the expanded gap causing the rattling.

Namely, "the sealing function from the outside and sealing function among the individual flow passages" of the swivel joint is impaired, and as a result, the disadvantage of reduction in extension and contraction ability of the cylinder occurs.

SUMMARY OF THE INVENTION

In view of the disadvantages of the above-described example of the prior art, an object of the present invention is to provide a fluid cylinder with a swivel joint which not only eliminates the disadvantages of the above-described prior art example, but also is more improved with high utility.

In order to attain the above-described object, a first aspect of a fluid cylinder with a swivel joint according to the present invention is a fluid cylinder with a swivel joint comprising a cylinder tube, a piston fitted into the cylinder tube to be slidable in the cylinder tube, and a piston rod in which with a part at a rod front end portion side being protruded outside the cylinder tube and the piston being integrally fitted thereon, a protrusion amount of the part at the rod front end portion side to an outside of the cylinder tube is changed according to entrance and exit of fluid into and out of a chamber at a rod side and a chamber at a side opposite the rod inside the cylinder tube, an entire body being extended and contracted according to a change in the protrusion amount, the cylinder comprising a pin hole, into which a pin provided at another member is fitted, in at least one end portion of a tube rear end portion being an end portion at a side of the chamber at the side opposite the rod of the cylinder tube and the rod front end portion, and relative rotation of the cylinder tube around the pin is freely made during extension and contraction of the cylinder, the cylinder further comprising
a first opening provided in an outer circumferential surface of the pin,
a second opening, which is provided in an inner circumferenctial surface of the pin hole, and always opposes to the first opening even when the cylinder tube relatively rotates around the pin,
a third opening provided in an end surface of the pin, and
a swivel flow passage having a first flow passage provided inside the pin and leading from the first opening to the third opening, and a second flow passage leading from the second opening into the cylinder tube, in which the first flow passage and the second flow passage always communicate with each other via the first opening and the second opening even when the cylinder tube relatively rotates around the pin, and is characterized in that
the pin provided with the first opening, the third opening and the first flow passage is a pin which is fitted in a pin hole of the rod front end portion, and
the second flow passage is provided inside the piston rod.

To be brief, the above-described first structure is that the flow passage leading to the chamber in the cylinder at the side of the rod is provided in the rod, the pin hold in the rod front end portion and the pin fitted in this pin hole are formed into a swivel joint so that the flow passage is normally led outside even when the pin hole and the pin are relatively rotated. Thereby, the conventional flow passage being the pipe provided along the cylinder outer surface is eliminated. The details are as follows.

According to the above-described first structure, the pin including the first and the third opening and the first flow passage is the pin which is fitted in the pin hole in the rod front end portion. In addition, even when the tube relatively rotates around the pin, the second flow passage normally communicating with the first flow passage via the first and the second openings are provided inside the rod. Specifically, it is not necessary to construct the flow passage leading to the rod side chamber in the tube with a pipe extensively provided along the outer circumferential surface of the tube as in the art of the aforementioned Utility Model. Consequently, a projected object being the pipe is deleted from the cylinder, and beauty of the outer appearance of the cylinder is increased. At the time of operations of dismantling structures in cities, various kinds of operations on an uneven ground and the like, it does not happen that the projected object being the pipe collides against the dismantled object, wood and branches, stones and rocks and the like and a non-operating vehicle due to an unexpected trouble such as oil leakage and the like occurs, which is feared in the art of the aforementioned Utility Model.

A second aspect of the fluid cylinder with the swivel joint according to the present invention is a fluid cylinder with a swivel joint comprising a cylinder tube, a piston fitted into the cylinder tube to be slidable in the cylinder tube, and a piston rod in which with a part at a rod front end portion side being protruded outside the cylinder tube and the piston being integrally fitted thereon, a protrusion amount of the part at the rod front end portion side to an outside of the cylinder tube is changed according to entrance and exit of fluid into and out of a chamber at a rod side and a chamber at a side opposite rod inside the cylinder tube, an entire body being extended and contracted according to a change in the protrusion amount, the cylinder comprising a pin hole, into which a pin provided at another member is fitted, in at least one end portion of a tube rear end portion being an end portion at a side of the chamber at a side opposite the rod of the cylinder tube and the rod front end portion, and relative rotation of the cylinder tube around the pin is freely made during extension and contraction of the cylinder,
the cylinder further comprising
a first opening provided in an outer circumferential surface of the pin,
a second opening, which is provided in an inner circumferenctial surface of the pin hole, and always opposes to the first opening even when the cylinder tube relatively rotates around the pin,
a third opening provided in an end surface of the pin, and
a swivel flow passage having a first flow passage provided inside the pin and leading from the first opening to the third opening, and a second flow passage leading from the second opening into the cylinder tube, in which the first flow passage and the second flow passage always communicate with each other via the first opening and the second opening even when the cylinder tube relatively rotates around the pin, and is characterized in that
the second opening is provided in a relative rotation range of the cylinder tube around the pin in the inner circumferential surface of the pin hole.

According to the above-described second structure, even when the tube relatively rotates around the pin, the second flow passage normally communicating with the first flow passage via the first and the second openings is provided in the relative rotation range of the tube around the pin in the pin hole inner circumferential surface. The usage of the fluid cylinder in which "it is relatively rotated in the range of the entire circumferential angle (specifically, 360 degrees) around the pin" is extremely rare practically, and the usage of "relatively rotating in the circumferential angle range around the pin from 100 degrees to 120 degrees" is adopted in most cases. Specifically, as the swivel joint, the second opening normally communicating with the first opening does not need to be provided in the entire circumference as in the art of the aforementioned Utility Model, and it may be provided only in the relative rotation range of the tube around the pin, which is determined by the usage of the fluid cylinder. It is in the above-described second structure that it is provided in such a manner.

It can be shown with an example that the relative rotation range is the range in the fluid cylinder of the usage in which, the range of, for example, the fluid cylinder being strongly pressed to be in contact with in both contraction and extension is substantially the same. In concrete, the boom cylinder of the hydraulic shovel in the "Best Mode for Carrying out the Invention" which will be described later extends and contracts against the tare weight of the working machine, and therefore in any of the extension and contraction, the range in which it is strongly pressed to be in contact therewith is the same. It is desirable to apply the above-described second structure to the above boom cylinder. That is, in the fluid cylinder, a gap between the pin and the pin hole in the range of being strongly pressed to be in contact therewith is naturally small, but a gap in the range of the opposite range is expanded on the other hand.

In the above situation, if the second opening is provided in the entire circumference (specifically, the total circumference range) as the art of the above-described Utility Model, the expanded gap directly communicates with the second opening, and therefore the fluid inside the second opening easily leaks outside via the expanded gap. Specifically, it is difficult to maintain the functions as the swivel joint.

On the other hand, the above-described second structure is provided with the second opening in the relative rotation range around the pin, and therefore irrespective of the size of the gap, even when the gap is further expanded by the long period of operation of, for example, the fluid pressure cylinder, the further expansion of the gap occurs in the counter-relative rotation range, but it does not occur in the relative rotation range in which it is strongly pressed to be in contact with each other, and therefore the function as the swivel joint can be maintained for a long period of time.

In a third aspect of the fluid cylinder with the swivel joint, the structure in which the relative rotation range is set on a surface at the piston side in the pin hole inner circumferential surface when the second flow passage reaches the chamber at the side opposite the rod in the cylinder tube may be suitable.

The above-described third structure is a limited structure of the aforementioned second structure, and is the structure which provides remarkable operational effects depending on the usage of the fluid cylinder. Specifically, in the third structure, "when the second flow passage reaches the chamber at the side opposite the rod inside the tube" means that when high pressure fluid is flown into the second flow passage, the liquid cylinder is extended. The high pressure fluid naturally leaks more from the gap to the outside for the same gap as compared with the low pressure fluid.

Incidentally, as the usage of many cylinders, in the cylinder during its extension, the surface at the piston side in the pin hole inner circumferential surface is strongly pressed and abuts against the surface at the piston side in the outer circumferetial surface. However, since the pin and pin hole are strongly pressed and abuts against on this surface, the gap between the pin and the pin hole becomes smaller, and therefore even high pressure fluid is sharply controlled to leak outside via the narrow gap. In this situation, the gap between the pin and the pin hole at the opposite side surface is expanded, but the gap thus expanded does not directly communicate with the second opening. Specifically, in the third structure, when the second flow passage reaches the chamber at the side opposite to the rod inside the tube, the second opening is provided in the range being the surface at the side of the piston in the pin hole inner circumferential surface, and therefore, irrespective of the size of the gap, even if the gap is further expanded by the operation of, for example, the fluid pressure cylinder for a long period of time, this further expansion of the gap occurs in the surface at the side opposite the piston, but it does not occur to the surface at the piston side which is strongly pressed to be in contact with it, and therefore the function as the swivel joint is maintained over a long period.

Further, in a fourth aspect of the fluid cylinder with the swivel joint,
the structure in which the relative rotation range is set on a surface at a side opposite the piston in the pin hole inner circumferential surface when the second flow passage reaches the chamber at the rod side in the cylinder tube may be suitable.

In the above-described fourth structure, "when the second flow passage reaches the chamber at the rod side in the tube" means that when the high pressure fluid is flown into the second flow passage, the fluid cylinder is contracted. The high pressure fluid naturally has more fluid leakage from the gap to the outside for the same gap as compared with the low pressure fluid. Specifically, the fourth structure is the reverse of the above-described third structure. Accordingly, simple repeated explanation of the operational effects in the above-described third structure will be omitted. The fourth structure is the separate structure since it can be individually provided as the rod front end portion being formed into the swivel joint (corresponding to the fourth embodiment) and the tube rear end portion being formed into the swivel joint (corresponding to the above described third structure) in the second embodiment in the "Best Mode for Carrying out the Invention" which will be described later.

Each structure described below is the structure of the preferable combination of the sealing members in the region forming the swivel joint in the aforementioned first to the fourth structure. Specifically, (A) it is desirable to include at least one first annular seal, which is provided at least at one region of an outer circumference of the pin separated from the first opening and said second opening to both end surface side of the pin.

(B) it is desirable to include at least one annular labyrinth provided in at least one region of the outer circumferential surface of the pin and the inner circumferential surface of the pin hole from the first opening and the second opening to at least the one first annular seal.

(C) it is desirable to include at least one second annular seal which is provided in at least one region in the outer circumference of the pin separated from at least the one first annular seal to both end surface sides of the pin and is fitted onto the pin, at least one third flow passage which is opened in at least one region of the outer circumferential surface of the pin and the inner circumferential surface of the pin hole, between at least one first annular seal and the at least one second annular seal, and reaches the swivel flow passage, and a check valve which is provided in the at least the one third flow passage and allows only flow of fluid into the swivel flow passage.

(D) it is desirable to include a filter detachably attached from an outside at a side of the check-valve, opposite to the swivel flow passage, in said third flow passage.

(E) An annular gap may be provided from a position of at least one of a first annular seal or a second annular seal, which is placed at an end surface side of the pin to a portion between the outer circumferential surface of the pin and the inner circumferential surface of the pin hole opposing at the end surface side of the pin.

The operational effects of each of the structures (A) to (E) will be described in "Best Mode for carrying out the Invention", and therefore redundant explanation here will be omitted.

BRIEF DESCRIPTION OF THE DRAWINGS

FIG. 4A and FIG. 4B show partial sections of a rod front end portion in FIG. 1,

FIG. 5A and FIG. 5B are enlarged views of a swivel joint in the first embodiment.

BEST MODE FOR CARRYING OUT THE INVENTION

Figure 1:
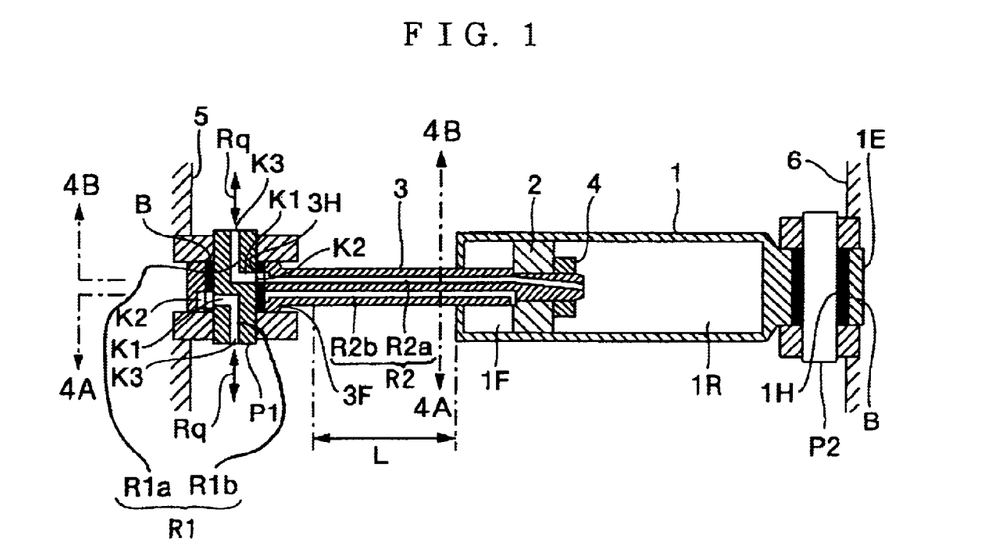
FIG. 1 is a sectional side view of a first embodiment of a fluid cylinder with a swivel joint according to the present invention.
Figure 2:
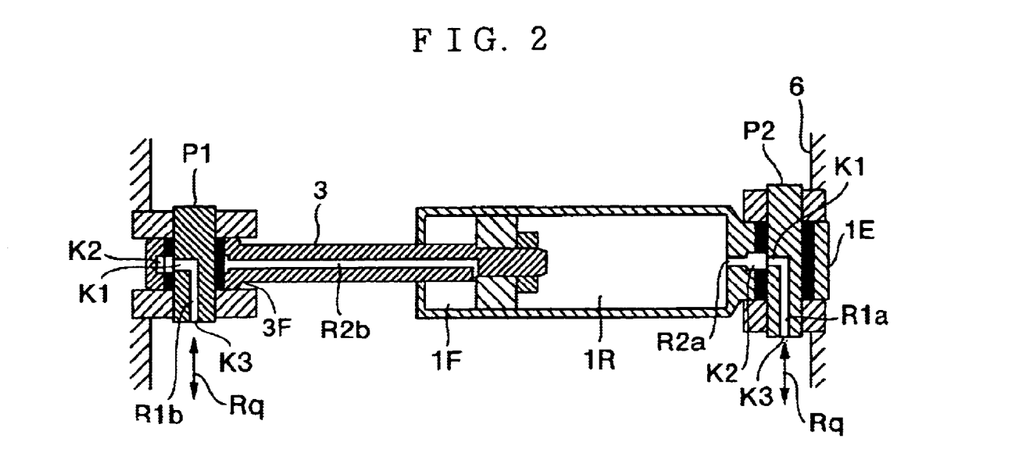
FIG. 2 is a sectional side view of a second embodiment of the fluid cylinder with the swivel joint according to the present invention.
Figure 3:
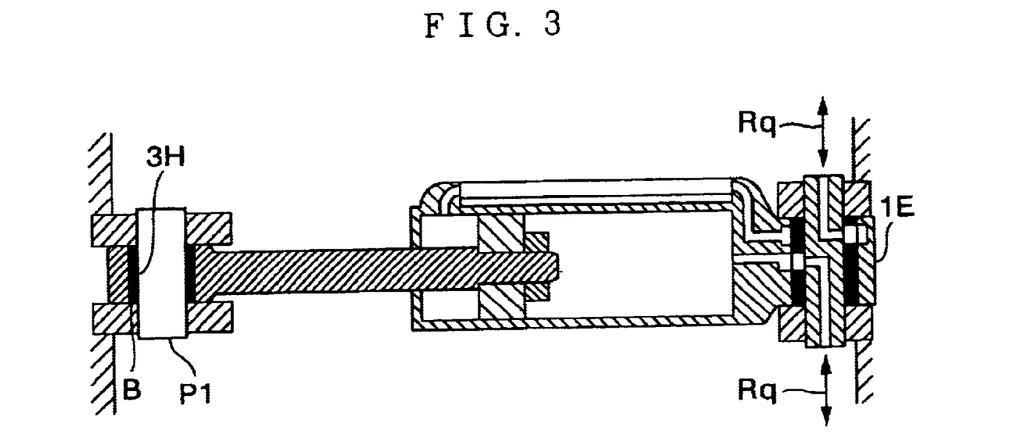
FIG. 3 is a sectional side view of a third embodiment of the fluid cylinder with the swivel joint according to the present invention.

Preferred embodiments of a fluid cylinder with a swivel joint according to the present invention will be explained with reference to FIG. 1 to FIG. 8. FIG. 1 shows a first embodiment, FIG. 2 shows a second embodiment, and FIG. 3 shows a third embodiment. FIG. 1 (the first embodiment) shows the one with a rod front end portion 3F formed into a swivel joint, FIG. 2 (the second embodiment) shows the one with the rod front end portion 3F and a tube rear end portion 1E respectively formed into swivel joints, and FIG. 3 (the third embodiment) shows the one with the tube rear end portion 1E formed into a swivel joint. A fluid cylinder in each of the embodiments is a double acting and single rod hydraulic cylinder, and as shown in FIG. 1 to FIG. 3, it includes a cylinder tube 1 (hereinafter called a tube 1), a piston 2 fitted in the tube 1 to be slidable in the tube 1, and a piston rod 3 (hereinafter called a piston 3) which is protruded to the left in FIG. 1 outside the tube 1 at the side of the front end portion 3F, integrated with the piston 2 by being fastened with a nut 4, and fitted thereon, so that a protrusion amount L to an outside of the tube 1 at the front end portion side is changed by entrance and exit of working fluid Rd to and from a rod-side chamber 1F and a chamber 1R at a side opposite the rod inside the tube 1. The entire cylinder is contracted and extended by a change in the protrusion amount L. The details are as follows.

The hydraulic cylinder of the first embodiment includes in the rod front end portion 3F a pin hole 3H in which a pin P1 fixedly provided at another movable member 5 is fitted, and at the tube rear end portion 1E a pin hole 1H in which a pin P2 provided at another movable or fixed member 6 is fitted. Thus, relative rotation of the tube 1 (that is, the cylinder itself) around each of the pins P1 and P2 is freely made at the time of contraction and extension of the cylinder. The pin P1 includes a first opening K1 in its outer circumferential surface and a third opening K3 in a pin end surface, and it also includes a first flow passage R1 for allowing the first and third openings K1 and K3 to communicate with each other inside the pin. Meanwhile, the pin hole 3H includes a second opening K2 in its inner circumferential surface, and a second flow passage R2 leading from the second opening K2 to the inside of the tube 1 in the rod 3.

The second opening K2 is provided so as to normally oppose the first opening K1 even if the tube 1 relatively rotates around the pin P1. The first and second flow passages R1 and R2 are generic names for flow passages R1b and R2b leading to the chamber 1F at the rod side in the tube 1, and flow passages R1a and R2a leading to the chamber 1R at the side opposite the rod in the tube 1. Portions painted black around the pins P1 and P2 in the drawing show a bush B, and in this embodiment, an inner hole of the bush B is made to be the pin hole 3H.

According to the above-described first embodiment, the following operation is made. When the cylinder is contracted and extended, the cylinder is rotated around the pins P1 and P2, and the second opening K2 normally opposes the first opening K1 irrespective of the rotation of the cylinder. As a result, the first and the second flow passages R1 to R2 (specifically, the flow passages R1a to R2a, and the flow passages R1b to R2b) are never shut off. Namely, the rod front end portion 3F is formed into the swivel joint with the pin P1. Hereinafter, these flow passages are called "swivel flow passages R1a to R2a, and R1b to R2b".

According to the above-described first embodiment, the following effects are provided. Since the rod front end portion 3F is formed to be the swivel joint with the pin P1, the second flow passage R2b as well as the second flow passage R2a can be provided inside the rod 3 and is actually provided. Specifically, as the art of the aforementioned Utility Model, it is not necessary to construct the flow passage (corresponding to "R2b") leading to the rod side chamber (corresponding to "1F") in the tube with a pipe extensively provided along the outer circumferential surface of the tube 1. Specifically, a protruded object as the pipe can be removed from the cylinder, whereby the outer beauty of the cylinder is increased. In addition, in an operation of dismantling structures in a city and in various kinds of operations and the like on an uneven ground, the fact that "a protruded object as a pipe collides with dismantled objects, wood and branches, stones and rocks and the like, whereby a non-operating vehicle due to unexpected trouble such as oil leakage occurs", which is feared in the art of the aforementioned Utility Model, is eliminated.

A hydraulic cylinder as the second embodiment is as shown in FIG. 2. Only the point in which the second embodiment differs from the first embodiment in FIG. 1 will be described. The first embodiment in FIG. 1 is the hydraulic cylinder in which the rod frond end portion 3F is formed to be a swivel joint, while the second embodiment is the one in which the rod front end portion 3F and the tube rear end portion 1E are formed to be the swivel joints respectively as shown in FIG. 2. Specifically, the swivel flow passages R1a to R2a in the first embodiment are deleted from the first embodiment with the first to the third openings K1 to K3, and are placed between the tube rear end portion 1E and the pin P2.

According to the above-described second embodiment, the following operation is made. When the cylinder is contracted and extended, the cylinder rotates around the pins P1 and P2, but each of the second openings K2 in the rod front end portion 3F and the tube rear end portion 1E always opposes each of the first openings K1 irrespective of the rotation of the cylinder, and therefore the first and second flow passages R1 to R2 (specifically, the flow passages R1a to R2a, and the flow passages R1b to R2b) are not shut off. That is, the rod front end portion 3F is formed to be a swivel joint with the pin P1, while the tube rear end portion 1E is formed to be a swivel joint with the pin P1, while the tube rear end portion 1E is formed to be a swivel joint with the pin P2.

According to the above-described second embodiment, the following effects are provided. Since the rod front end portion 3F and the tube rear end portion 1E are formed to be swivel joints, respectively, the second flow passage R2b can be provided inside the rod 3, and is actually provided. As a result, the substantially same effects as the aforementioned first embodiment can be provided.

A hydraulic cylinder according to the third embodiment is as shown in FIG. 3. Only the point in which the third embodiment differs from the first embodiment in FIG. 1 will be described. The first embodiment in FIG. 1 is the cylinder in which the rod front end portion 3F is formed to be a swivel joint, while the third embodiment is the cylinder in which the tube rear end portion 1E is formed to be a swivel joint as shown in FIG. 3. With this explanation, this embodiment is not different from the art of the aforementioned Utility Model at all. However, the swivel joint in the third embodiment has a totally unexpected point of difference (internal structure) in the technical idea in the aforementioned Utility Model, the detail of which will be described later. Though not mentioned in the explanation of the above-described first and the second embodiments, the internal structure of this swivel joint in the third embodiment is included in the swivel joints in the first and the second embodiment. Hereinafter, the internal structure of the swivel joint will be described in detail with reference to FIG. 4A, FIG. 4B, FIG. 5A and FIG. 5B.

Figure 4A:
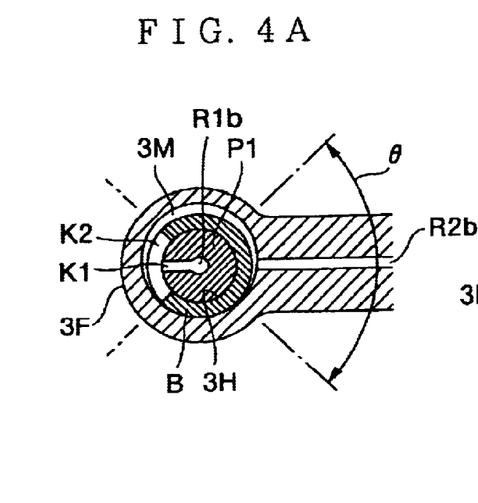
FIG. 4A is a sectional view taken along the line 4A to 4A in FIG. 1.
Figure 4B:
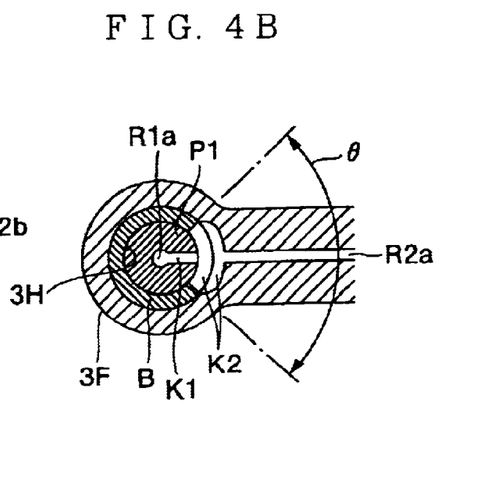
FIG. 4B is a sectional view taken along the line 4B and 4B in FIG. 1.

FIG. 4A and FIG. 4B are partial sectional views of the rod front end portion 3F shown in FIG. 1, FIG. 4A is a sectional view taken along the line 4A to 4A in FIG. 1, and FIG. 4B is a sectional view taken along the line 4B to 4B in FIG. 1.

FIG. 4A shows the swivel flow passage R1b to R2b leading to the rod side chamber 1F, shown in FIG. 1. The second opening K2 is provided in a relative rotation range θ of the cylinder around the pin P1 in the inner circumferential surface of the pin hole 3H, and the range θ is provided in the surface of inner circumferential surface of the pin hole 3H at the side opposite the piston. For convenience of the explanation, this will be called "the type with the second opening at the side opposite the piston". More specifically, the second opening K2 is provided in the surface of the bush B at the side opposite the piston, and a groove 3M leading from the second opening K2 to the second flow passage R2b is provided inside the rod front end portion 3F. That is, the groove 3M is covered with the bush B from inside except for the second opening K2.

The groove 3M is provided by performing mechanical circular cutting, decentering to some extent upward in the drawing from the axial line (the perpendicular direction to the paper surface) of a circular bush insertion hole. It is not restrictive to provide the groove 3M in the bush insertion hole of the rod front end portion 3F as in the above-described example, but the groove 3M communicating with the second opening K2 of the bush B may be provided in a bush outer circumferential surface.

Meanwhile, FIG. 4B shows the swivel flow passages R1a and R2a leading to the chamber 1R at the side opposite the rod in FIG. 1. The second opening K2 is also provided in the relative rotation range θ of the cylinder around the pin P1 of the inner circumferential surface of the pin hole 3H, but this range θ is provided on the surface at the piston side, unlike the above-described "type with the second opening at the side opposite the piston". This will be called "a type with the second opening at the piston side" hereinafter for convenience of explanation. More specifically, the second openings K2 are provided from the bush B into the rod front end portion 3F. The second opening K2 at the rod front end portion 3F side is previously formed in the mold when the rod front end portion 3 is a casting (another example of production of a groove).

The effects of the swivel joints shown in FIG. 4A and FIG. 4B will be explained. Fluid cylinders are generally used in such a manner as to "relatively rotate in the range of total circumferential angel around the pin" regardless of hydraulic cylinders, but it is rarely used in such a manner practically. It is mainly used in such a manner as to "relatively rotate in circumferential angle range θ around the pin where θ=100 degrees to 120 degrees" (first general usage).

Further, as second general usage, at the time of contraction of the hydraulic cylinder, the pin P1 and the pin hole 3H firmly press each other to abut against each other on the respective surfaces at the side opposite the piston, while at the time of extension of the hydraulic cylinder, the pin P1 and the pin hole 3H firmly press each other to abut against each other on the respective surfaces at the piston side. Here, the time of contraction of the hydraulic cylinder means the time when pressure oil from the outside flows into the rod side chamber 1F via the swivel flow passages R1b to R2b, and the working fluid in the chamber 1R at the side opposite the rod is discharged outside via the swivel flow passages R1a to R2a. The time of extension of the hydraulic cylinder means the time when pressure oil from the outside flows into the chamber 1R at the side opposite the rod via the swivel flow passages R1a to R2a and working fluid in the rod side chamber 1F is discharged outside via the swivel flow passages R1b to R2b.

In this second manner of use, strong pressure occurs in both contraction and extension, and therefore a gap between the pin P1 and the pin hole 3H at the side opposite the strong pressure is increased. When this gap is further increased by abrasion and the like, the working fluid from the second opening directly leaks outside via the gap when the second opening is provided in an entire circumference of the inner circumference surface of the pin hole 3H as, for example, in the art of the aforementioned Utility Model.

In the first and third embodiment, the first and the second openings K1 and K2 to the chambers 1F and 1R are placed adjacent to each other. As a result, when the second opening is provided in the entire circumference of the inner circumferential surface of the pin hole 3H, for example, as in the art of the aforementioned Utility Model, even if an annular seal fitted onto the pin P1 is provided around the pin P1 of the second openings K1 and K2, the gap which this seal is to seal is increased. Thus, the first and the second openings K1 and K2 easily communicate with each other.

Specifically, if the second opening is provided in the entire circumference of the inner circumferential surface of the pin hole 3H as in the art of the aforementioned Utility Model, "a sealing function between the individual flow passages and an outside" as a swivel joint cannot be maintained.

However, the swivel joints as shown in FIG. 4A and FIG. 4B are organically combined with the above-described first and second usage to correspond thereto. Specifically, in the first and the second usage, strong pressure contact is allowed at the strong pressure side (the left side in the drawing) of the pin P1 and the pin hole 3H at the time of contraction of the cylinder as shown in FIG. 4. Accordingly, the leakage to the outside is restricted. On the other hand, the second opening K2 itself does not exist at the side opposite the strong pressure (the right side in the drawing), and thus the function as the swivel joint is not impaired at all.

Meanwhile, at the time of extension of the cylinder, the strong pressure contact is also allowed at the strong pressure side (the right side in the drawing) of the pin P1 and the pin hole 3H as shown in FIG. 4B. Accordingly, leakage to the outside is restricted. However, the second opening K2 itself does not exist at the side opposite the strong pressure (the left side in the drawing), and thus the function as the swivel joint is not impaired at all.

Specifically, in the above-described third embodiment, the swivel joint is constructed as shown in FIG. 4A and FIG. 4B as shown in FIG. 3. Each swivel joint in the first and the second embodiment is constructed as in FIG. 4A and FIG.

4B, as shown in FIG. 1 and FIG. 2. Consequently, according to the first to the third embodiment, the function as the above-described swivel joint is not impaired at all. Especially, even if the abutting surfaces of the pin and the pin hole are worn out, the wear has nothing to do with the function of the above-described swivel joint. Specifically, the function maintenance characteristic occurs to this swivel joint.

Figure 5A:
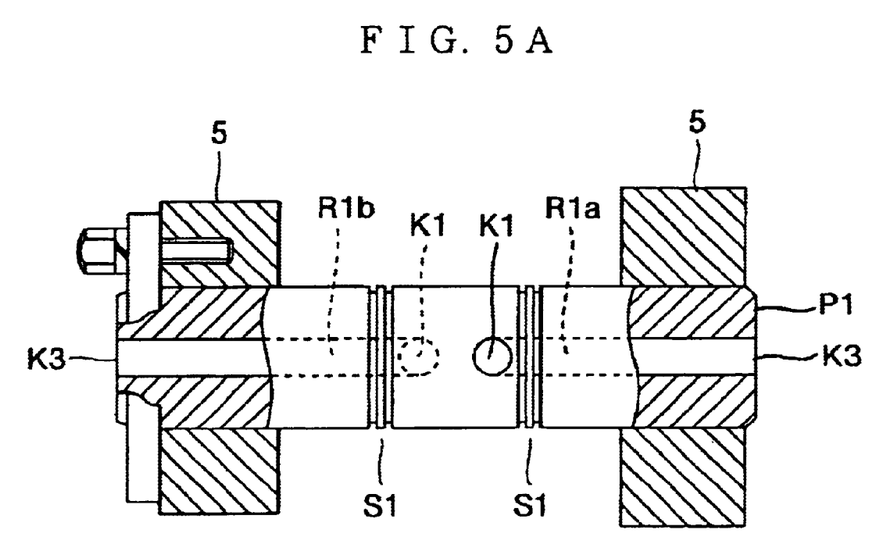
FIG. 5A shows another movable member side.
Figure 5B:
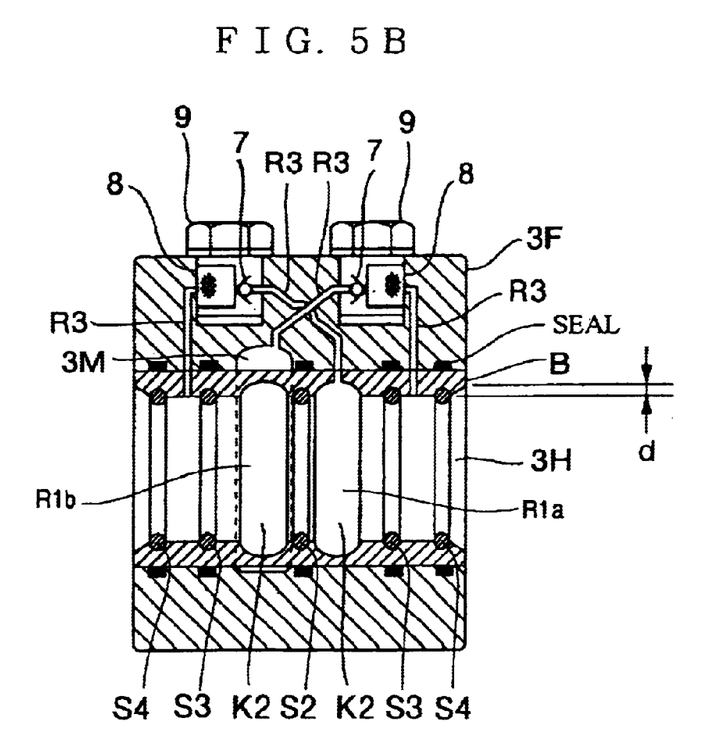
FIG. 5B shows the rod front end portion side.

Incidentally, in order to maintain the above-described function as the swivel joint, the sealing member (seal member) becomes the basis. A sealing member in the above-described first embodiment will be explained with reference to FIG. 5A, FIG. 5B and FIG. 6. FIG. 5A and FIG. 5B are enlarged views of the swivel joint in the above-described first embodiment. FIG. 5A shows the other movable member 5 side, and to facilitate the explanation, the pin P1 is temporarily inserted into the pin hole of the movable member 5 and fastened to the movable member 5 with bolts to be fixed. Meanwhile, FIG. 5B shows the rod front end portion 3F side to make it possible to visually correspond to FIG. 5A in the drawing.

As shown in FIG. 5A, labyrinth grooves S1 are provided in the outer circumference of the pin end surface near positions at which the first openings K1 at the right and left in the drawing are located. One or a plurality of the labyrinth groove S1 are provided at a position of the outer circumference of the pin end surface side corresponding to an area between a seal S3 that will be described later and the aforementioned first opening K1.

Meanwhile, as shown in FIG. 5B, in an inner circumferential surface of the bush B, a groove is provided between both the second openings K2 so that O-rings S2 (annular seals S2) are fitted in this groove. Further, in the inner circumferential surface of the bush B, two grooves are provided with a little space between them at spots at the pin end surface side beyond the labyrinth groove S1 from the located position of each of both the second openings K2, and O-rings S3 and S5 (annular seals S3 and S4) are fitted in these grooves. Further, in the rod front end portion 3F, third flow passages R3, which are opened in the inner circumferential surface of the bush B between the O-rings S3 and S4 and lead to the swivel flow passage (the groove 3M in this example), are included, check-valves 7 for allowing only fluid flow to the swivel flow passage 3M are provided in the third flow passages R3, and filters 8 are provided at the side opposite to the swivel flow passage of the check-valves 7 to be attachable and detachable from outside. Further, both end surfaces of the inner circumferences of the bush B are formed to be tapered to extend outward from the positions of the O-rings S4. That is, annular gaps d are provided between the outer circumferential surface of the pin P1 and the inner circumferential surface of the pin hole 3H at this region. The annular gap d may be provided at the pin P1 side.

As the annular seals S2 to S4, lip-shaped seals, which have higher sealing ability than the above-described O-rings, are desirable. Further, as the annular seal S4, it is desirable to use a double lip-shaped seal with an oil seal for preventing a large quantity of working fluid from leaking outside as an inner lip, and with a dust seal for preventing dust from entering an inside from an outside as an outer lip, rather than O-rings and simple lip-shaped seals.

The operational effects of the structure between the sealing members in FIG. 5A and FIG. 5B will be explained hereinafter.

(1) The effects of the annular seal S2 are as follows.

The seal S2 prevents leakage of the working fluid, namely, communication, between the swivel flow passages R1$a$ to R2$a$ and the swivel flow passage R1$b$ to R2$b$, which should be shut off from each other at the left and right in the drawing.

(2) The effects of the labyrinth groove S1 and the annular seal S3 are as follows.

Though the seals S2 to S4 are called seals (sealing), a very small quantity of working fluid leaks outside from the seal surfaces. The seals can maintain their seal life (sealing ability) only when oil leaks from the seals. For example, if oil cannot easily leaks outside from the seal S3, lubrication for sliding surfaces between the pin P1 and the bush B between the seals S3 and S4 cannot be satisfactorily attained. Consequently, for example, when working fluid is at high pressure, the pressure oil easily leaks from the seal S3 to the seal S4. What optimizes this leakage is the labyrinth groove S1. Pressure loss occurs to the labyrinth groove S1 as oil passes each of the labyrinth grooves and when it reaches the seal S3, ultimate pressure is reduced, whereby oil leakage from the seal S3 to the seal S4 is restricted.

In the above-described first embodiment, the labyrinth grooves are not provided at both sides of the seal S2. This is based on the following reason. Microscopically, a change in the posture of the cylinder at the time of contraction of the cylinder occurs three-dimensionally, and therefore the seals S2 and S3 also change the postures three-dimensionally, whereby they are distorted and oil leaks outside easily. However, the seal S2 is located at substantially a center in the lateral direction in the drawing, but the seals S3 are located at both outer sides. Accordingly, the three-dimensional change in the posture exerted on the seal S2 is less than the three-dimensional change in the posture exerted on the seals S3. Consequently, the reason is that the seal S2 maintains sealing ability more easily for a long period of time than the seal S3. It goes without saying that labyrinth grooves may be provided at both ends of the seal S2.

(3) The effects of the annular seal S4, the check-valve 7 and the filter 8 are as follows.

As described above, the proper oil leakage from the seal S3 is essential to satisfactorily attain lubrication for the sliding surfaces between the pin P1 and the bush B. However, if it is left, oil leakage to the outside from the seal S3 occurs, which results in drop of leakage oil from the swivel joint to the ground, and the deterioration of the outer appearance caused by dust adhering to the outer surface of the rod front end portion 3F which is wet with oil. Then, in the above-described embodiment, the seal S4 is provided and oil is accumulated between the seals S3 and S4 to enhance lubricity, and the third flow passage R3 including the filter 8 and the check-valve 7 in this order is provided from the area between the seals S3 and S4 to the swivel flow passage to make it possible to discharge the oil accumulated between the seals S3 and S4 into the swivel flow passage. It should be noted that the bush B is generally provided with a flow groove for oil for promoting the lubrication on the entire surface in the hole inner surface. In the present embodiment, this groove is used as an oil basin, and an opening of the third flow passage R3 is provided at the bottom of this groove.

Here, the check-valve 7 is indispensable. Meanwhile, the filter 8 catches abnormal wear components occurring to the sliding surfaces between the pin P1 and the bush B, and when the sliding surfaces are normally worn, it is basically unnecessary. That is, it is desirable to place the filter 8 as the protection of the check-valve 7, and thus, in this embodiment the filter is placed.

Specifically, the check-valve 7 naturally allows only the fluid flow to the swivel flow passage 3M. If this is reversed, at the time when the inside of the swivel flow passage 3M at the discharge side is at high pressure, the high-pressure oil inversely flows between the seals S3 and S4 via the check-valve 7, which results in a large quantity of oil leakage from the seal S4 to the outside. That is, it is the aim of the placement of the filter 8 to prevent very small accumulation of worn components on the sealing surface of the check-valve 7.

As such a check-valve 7, a spool type, poppet type, ball type and the like can be prepared, but the check-valve 7 in this swivel joint is generally desired to be microminiature, and therefore it is suitable to adopt a ball type which is preferable for microminituarization.

Meanwhile, the filter 8 may be magnetic, an ion adsorption type, a filter paper type and the like as long as the filter 8 is small, and with use of a filter paper type, the mesh is better if it is smaller. It is desirable that the check-valve 7 and the filter 8 are both checkable. Accordingly, in the above-described embodiment, the check-valve 7 and the filter 8 are integrated and housed in a screwed type of plug 9 to the rod front end portion 3F, and the plug 9 is attachable and detachable, checkable and replaceable from the outside. The check-valve 7 and the filter 8 do not need to be integrated as in the above-described embodiment, and they may be provided individually to be attachable and detachable.

Though it is natural, when the cylinder is a pneumatic cylinder, the seal S4, the check-valve 7 and the filter 8 may be omitted, and only the seals S2 and S3, or only the seals S2 and S3 and the labyrinth groove S1 may be provided. However, in this case, it is desirable that the bush B is an oil impregnated type (so-called "(oil) impregnated metal"). It is also desirable that the seals S2 and S3 (if S4 is included, the S4 also) are oil impregnated type.

(4) The effects of the third flow passage R3 are as follows.

In the embodiment of the above-described swivel joint, the third flow passage R3 is included in the rod front end portion 3F, but it may be included in the pin P1. This is sometimes more favorable for the pin P1 in the working machine and in use.

In the embodiment of the above-describe swivel joint, the third flow passage R3 is simply explained as "the third flow passage R3 leading to the swivel flow passage (the groove 3M in this example)", but the explanation will be added to it as in the following items (A) and (B).

(A) FIG. 5B is a partially sectional view of the rod front end portion 3F of the above-described first embodiment. As shown in FIG. 5B, two of the third flow passages R3 are included, and each of the two third flow passages R3 is opened in the inner circumferential surface of the bush B between the seals S3 and S4 at the side of one of the swivel flow passages to lead to the other swivel flow passage. Explaining simply, as shown in FIG. 5B, both the third flow passages R3 and R3 are intersected. This is because when one of the swivel flow passages is at high pressure, the other swivel flow passage is simultaneously at low pressure at the contraction of the cylinder. Concretely, when one of the swivel flow passage is at high pressure, oil accumulates between the seals S3 and S4 at this side, and this oil can be discharged into the swivel flow passage at the low pressure side. This will be referred to as "the cross type drain circuit" for convenience of explanation.

Specifically, the cross type drain circuit can be applied to a swivel joint including a plurality of swivel flow passages, and therefore it is applied to the hydraulic cylinder in the first embodiment in FIG. 1. It can be naturally applied to the hydraulic cylinder in the third embodiment in FIG. 3.

Figure 6:
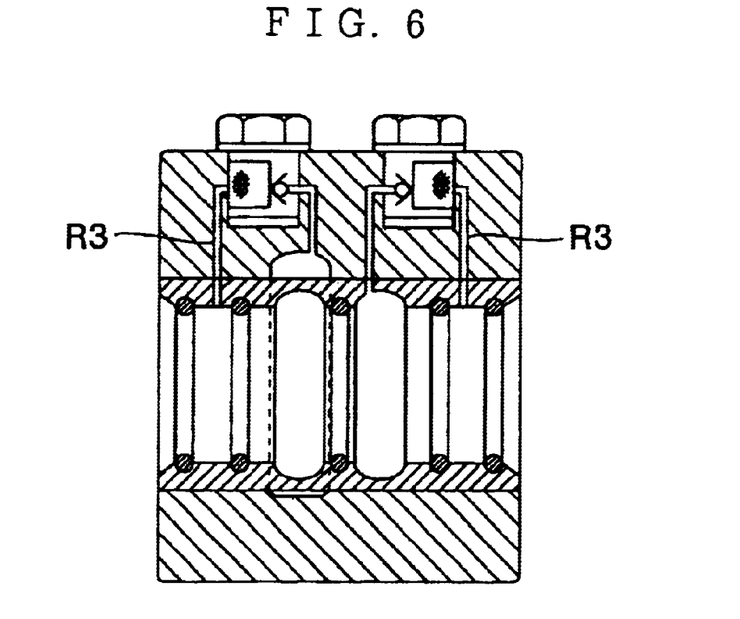
FIG. 6 is an enlarged view of another mode of the swivel joint in the first embodiment.

(B) The above-described cross type drain circuit is the constitution when contraction of the cylinder is seen at one point on the time base. However, when the contraction of the cylinder is continuously seen on the time base, after the extension of the cylinder in which, for example, one of the swivel flow passages is at high pressure and the other swivel flow passage is at low pressure, the one swivel flow passage eventually changes to low pressure without fail and the other swivel flow passage changes to high pressure, thereby contracting the cylinder. Specifically, low pressure and high pressure successively occur to each of the swivel passages (for each R1$a$ to R2$a$, and for each R1$b$ to R2$b$). After all, the timings in which the low pressure and high pressure occur differ. Accordingly, for the swivel joint in which an accumulation amount of oil between, for example, seals S3 and S4 per hour is small, two of the third flow passages R3 may be circuits independent of each other irrespective of the other swivel flow passages as shown in FIG. 6, instead of the above-described cross type drain circuit. This will be referred to as "the individual type drain circuit" for convenience of explanation hereinafter.

Specifically, the individual type drain circuit is unrelated to the number of swivel flow passages. In other words, the individual type drain circuit can be applied to the hydraulic cylinder of the third embodiment in FIG. 3 not to mention the hydraulic cylinder in the first embodiment in FIG. 1. The hydraulic cylinder in the second embodiment in FIG. 2 has the swivel joints including one swivel flow passage at each of the rod front end portion 3F and the tube rear end portion 1E. Thus, the above-described cross type drain circuit is not applicable, and only the individual type drain circuit is applicable.

(5) The effects of the annular gap d is as follows.

The annular gap d is provided at corresponding regions at both end surfaces of the inner circumference of the bush B or the pin P1 as described above.

Specifically, as described above, the change in the posture of the cylinder at the time of extension and contraction of the cylinder three-dimensionally occurs microscopically. Here, the pin P1 itself is supported at both ends thereof by the other movable member 5, but the rod front end portion 3F has a larger change amount toward its both ends by receiving the three-dimensional change in posture of the cylinder. The molded region of the annular gap d is the region where dust from outside easily enters and accumulates. Further, it is the entrance and exit for insertion of the pin P1. Specifically, the annular gap d prevents contact wear between the outer circumferential surface of the pin P1 and the inner circumferential surface of the pin hole 3H of the bush B even if the posture of the rod front end portion 3F three-dimensionally changes. The annular gap d prevents dust from being caught in the annular gap d even if the dust enters from the outside, by rightsizing the annular gap d, for example, by making it in a tapered form extending outward as described above. Furthermore, the annular gap d facilitates insertion and extraction of the pin P1 by forming it in a right shape, for example, by forming it in a tapered shape extending outward as described above, whereby breakage of the end surface of the bush B based on the collision with the end surface of the pin P1 is prevented.

Each of the above-described cylinders is not limited to a double acting type and a single rod type, and if a single acting type, a spring included type, a type without a spring, a double rod type, a telescopic type and the like are constructed as described above, the same operational effects as described above can be obtained. Further, the fluid is not limited to the above-described oil (working fluid), but the cylinder with use of other liquid or gas such as air may be suitable, and in this case, if this is constructed as described above, the same operational effects as described above can be obtained.

Preferred relationship of application (combination relationship) between the above-described first to third embodiment, the type of the second opening at the side opposite to the piston or the type of the second opening at piston side, and the cross type drain circuit or the individual type drain circuit will be explained with reference to a hydraulic shovel shown in FIG. 8 as an example.

Figure 8:
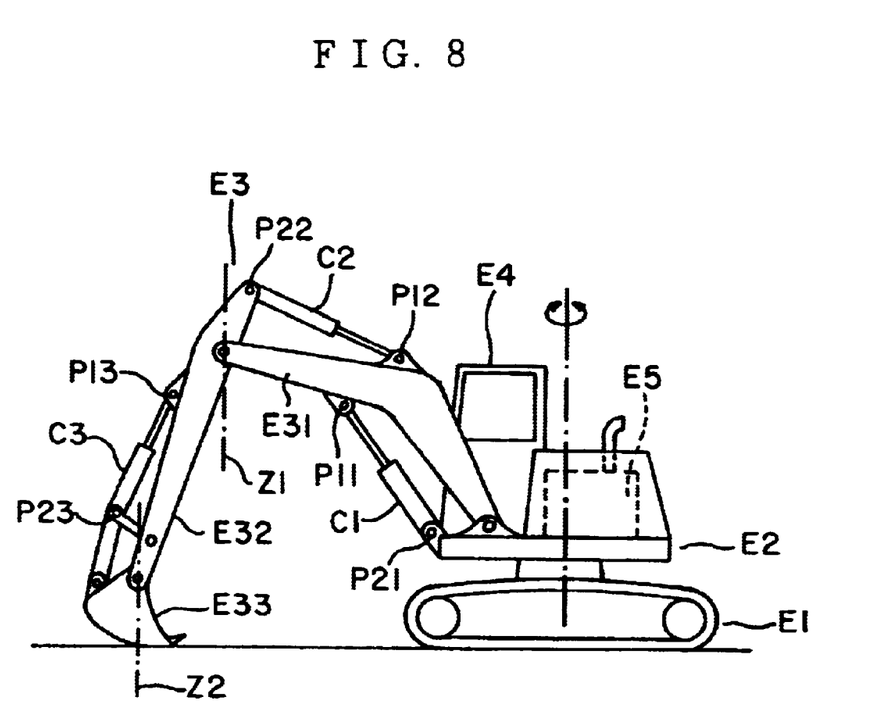
FIG. 8 is a side view showing an entire structure of a hydraulic shovel for explaining the application of the fluid cylinder with the swivel joint according to the present invention.

The hydraulic shovel shown in FIG. 8 includes an upper revolving superstructure E2 rotatably on a lower traveling unit E1, and includes a working machine E3, a driver's cab E4 and an engine E5 on the upper revolving superstructure E2. The working machine E3 is constructed by successively connecting a boom E31, an arm E32 and a bucket E33 at joints, and by making them decendable and ascendable (rotatable) by extension and contraction of hydraulic cylinders C1 to C3. Each of the cylinders C1 to C3 is a double acting type and single rod type, and receives pressure oil from a hydraulic pump (not shown) driven by an engine E5 via a directional change-over valve (not shown) changed based on an operation signal from the driver's cab E4 and the like to be extendable and contractible. Since the working machine E3 rotatably works as describe above, each of the cylinders C1 to C3 changes in its posture during extension and contraction thereof. Thus, each of the cylinders C1 to C3 is equipped with the swivel joint.

The cylinder C1 for raising and lowering the boom has its rod front end portion 3F supported by a pin P11 fixedly provided at a lower center surface of the boom E31, and also has a tube rear end portion 1E supported by a pin P21 fixedly provided at a front part of the upper revolving superstructure E2. The cylinder C2 for raising and lowering the arm has its rod front end portion 3F supported by a pin P12 fixedly provided at a center top surface of the boom E31, and also has the tube rear end portion 1E supported by a pin P22 fixedly provided at a rear end of the arm E32. The cylinder C3 for rotating the bucket has the rod front end portion 3F supported by a pin P13 fixedly provided at a center top face of the arm E32 and also has the tube rear end portion 1E supported by a pin P23 fixedly provided at a rear surface of the bucket E33.

(1) In the case of the above-described hydraulic shovel, the relative rotation range θ of an inner abutting surface against each of the pin, of each of the cylinders C1 to C3, with respect to each of the pins is about 110 degrees to 120 degrees around the pin P21 in the cylinder C1, around the pin P22 in the cylinder C2, and around the pin P23 in the cylinder C3. Meanwhile, it is about 4 degrees to 6 degrees around the pin P11 in the cylinder C1, around the pin P12 in the cylinder C2, and around the P13 in the cylinder C3.

Accordingly, it is desirable that each of the cylinders C1 to C3 is made the above-described first embodiment. This is because the relative rotation range θ at the portion formed into the swivel joint in each of the cylinders C1 to C3 is about 4 degrees to 6 degrees and small and thus there is little risk of oil leakage.

(2) The cylinder C1, however, always bears the tare weight of the working machine E3 itself and further the weight of excavated object irrespective of its extension and contracting action. Accordingly, at the time of both extension and contraction, the pin and the pin hole are strongly pressed to abut against each other at its rod side. That is, it is desirable that in the cylinder C1, the second openings at the two swivel joints are made to be "the type with the second opening at the piston side" instead of the first embodiment itself. If "both of them are made to be the type with the second opening at the piston side", the above-described "the bush B utilized to make the type with the second opening at the side opposite the piston" may be eliminated.

Figure 7:
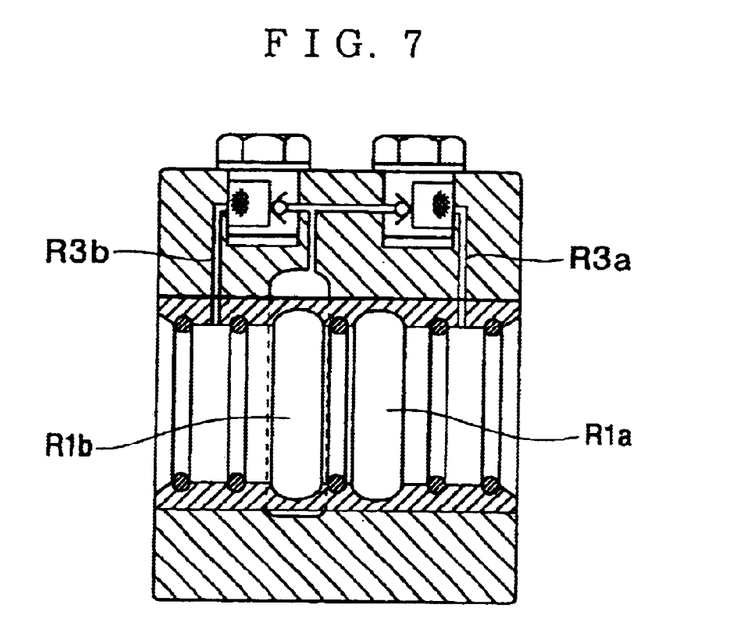
FIG. 7 is an enlarge view of still another mode of the swivel joint in the first embodiment.

The fact that the cylinder C1 always bears the tare weight of the working machine E3 itself and further receives the weight of the excavated object means that the chamber 1R at the side opposite the rod is always at high pressure, while the chamber 1F at the rod side repeats being at high pressure and low pressure. Accordingly, when the drain circuits are provided at both the swivel flow passages in the cylinder C1, they should be in the following manner. Specifically, as shown in FIG. 7, the drain flow passage R3a for discharging oil into the swivel flow passages R1b to R2b is provided at the swivel flow passages R1a to R2a of the chamber 1R at the side opposite the rod, which is always at high pressure, whereby leakage oil from the swivel flow passages R1a to R2a always at high pressure via the seal S3 is discharged into the swivel flow passage R1b to R2b in the chamber 1F at the rod side, which is at low pressure. It goes without explaining that the individual type of drain circuit (R3b in FIG. 7) should be applied to the swivel flow passage R1b to R2b of the chamber 1F at the rod side which is repeatedly at high pressure and low pressure. Specifically, in the fluid cylinder always bearing load in a specified direction in both extension and contraction as this cylinder C1, the drain circuit in which "the individual type drain circuit" and "the cross type drain circuit" are blended should be used.

(3) Meanwhile, the cylinders C2 and C3 are as follows. In the cylinders C2 and C3, the load direction based on the tare weight of the cylinders C1 and C2 by the tare weight from the arm E32 and the bucket E 33 differs according to whether the arm E32 and the bucket E33 are located at the front side or rear side with vertical lines Z1 and Z2 therebetween. Accordingly, unlike the cylinder C1, in the cylinders C2 and C3, the pins and the pin holes are strongly pressed to abut against each other on the surface at the piston side during extension generally, while during contraction, they are strongly pressed to abut against each other on the surface at the side opposite the piston. Specifically, it is desirable that they are made as in the first embodiment. That is, as shown in FIG. 1, it is desirable that the second openings in the two swivel joints are provided individually as "the type with the second opening at the piston side" and "the type with the second opening at the side opposite the piston".

(4) There is a case in which it is desirable to make the cylinders as in the second and the third embodiment, if the each of the cylinders C1 to C3 is mounted at the hydraulic shovel by reversing the front and the rear of each of the cylinders C1 to C3. For example, in each of the cylinders C2 and C3 in the above-described hydraulic shovel, the part at the tube 1 side is located at the front side. As a result, the center of gravity of the working machine 3E is located at the front side, and energy efficiency for the working vehicle is unfavorable. Accordingly, if the front and the rear of the cylinders C2 and C3 are reversed and mounted at the hydraulic shovel, the second and the third embodiment are preferable for them.

Specifically, the fluid cylinder with the swivel joint in each of the above-described embodiments, in which "the type with the second opening at the piston side" and/or "the type with the second opening at the side opposite the piston", and "the cross type drain circuit" and/or "the individual type drain circuit" are combined with any one of the embodiments, based on the first to third embodiment in accordance to various kinds of actual uses of various kinds of fluid cylinders as well as the hydraulic shovel, is extremely useful.

What is claimed is:

1. A fluid cylinder with a swivel joint comprising a cylinder tube, a piston fitted into said cylinder tube to be slidable in said cylinder tube, and a piston rod in which with a part at a rod front end portion side being protruded outside said cylinder tube and said piston being integrally fitted thereon, a protrusion amount of said part at the rod front end portion side to an outside of said cylinder tube is changed according to entrance and exit of fluid into and out of a chamber at a rod side and a chamber at a side opposite the rod inside said cylinder tube, an entire body being extended and contracted according to a change in said protrusion amount, said cylinder comprising a pin hole, into which a pin provided at another member is fitted, and relative rotation of said cylinder tube around said pin is freely made during extension and contraction of the cylinder, said cylinder further comprising a first opening, which is non-annular and provided in an outer circumferential surface of said pin, a second opening, which is non-annular and provided in an inner circumferential surface of said pin hole, and always opposes said first opening even when said cylinder tube relatively rotates around said pin, a third opening provided in an end surface of said pin, and a swivel flow passage having a first flow passage provided inside said pin and leading from said first opening to said third opening, and a second flow passage leading from said second opening into said chamber at said rod side and said chamber at said side opposite the rod inside said cylinder tube, in which said first flow passage and said second flow passage always communicate with each other via said first opening and said second opening even when said cylinder tube relatively rotates around said pin, wherein said second flow passage is provided inside said piston rod.

2. The fluid cylinder with the swivel joint according to claim 1, further comprising:

at least one first annular seal, which is provided in at least one region of an outer circumference of said pin between said first and second openings and at least one of said end surfaces of said pin.

3. The fluid cylinder with the swivel joint according to claim 2, further comprising:

at least one labyrinth groove provided in at least one region of the outer circumferential surface of said pin and the inner circumferential surface of said pin hole between said first and second openings and said at least one first annular seal.

4. The fluid cylinder with the swivel joint according to claim 2, further comprising:

at least one second annular seal which is provided in at least one region in the outer circumference of said pin between at least said one first annular seal and said a least one of said end surfaces of said pin and is fitted onto said pin, at least one third flow passage which is opened in at least one region of the outer circumferential surface of said pin and the inner circumferential surface of said pin hole, between at least said one first annular seal and at least said one second annular seal, and reaches the swivel flow passage, and a check-valve which is provided in at least said one third flow passage and allows only flow of fluid into said swivel flow passage.

5. The fluid cylinder with the swivel joint according to claim 4, further comprising:

a filter detachably attached from an outside at a side of said check-valve, opposite to the swivel flow passage, in said third flow passage.

6. A fluid cylinder with a swivel joint comprising a cylinder tube, a piston fitted into said cylinder tube to be slidable in said cylinder tube, and a piston rod in which with a part at a rod from end portion side being protruded outside said cylinder tube and said piston being integrally fitted thereon, a protrusion amount of said part at the rod front end portion side to an outside of said cylinder tube is changed according to entrance and exit of fluid into and out of a chamber at a rod side and a chamber at a side opposite the rod inside said cylinder tube, an entire body being extended and contracted according to a change in said protrusion amount, said cylinder comprising a pin hole, into which a pin provided at another member is fitted, in one end portion of at least one of a tube rear end portion and said rod front end portion, said tube rear end portion being an end portion at a side of said chamber at a side opposite said rod of said cylinder tube, and relative rotation of said cylinder tube around said pin is freely made during extension and contraction of the cylinder, said cylinder further comprising a first opening, which is non-annular and provided in an outer circumferential surface of said pin, a second opening, which is non-annular and provided in an inner circumferential surface of said pin hole, and always opposes said first opening even when said cylinder tube relatively rotates around said pin, a third opening provided in an end surface of said pin, and a swivel flow passage having a first flow passage provided inside said pin and leading from said first opening to said third opening, and a second flow passage leading from said second opening into one of said chamber at said rod side and said chamber at said side opposite the rod inside said cylinder tube, in which said first flow passage and said second flow passage always communicate with each other via said first opening and said second opening even when said cylinder tube relatively rotates around said pin, wherein said second opening is provided in a relative rotation range of said cylinder tube around said pin in the inner circumferential surface of said pin hole.

7. The fluid cylinder with the swivel joint according to claim 6, wherein said relative rotation range is set on a surface at said piston side in said pin hole inner circumferential surface when said second flow passage reaches said chamber at the side opposite the rod in said cylinder tube.

8. The fluid cylinder with the swivel joint according to claim 7, further comprising:

at least one first annular seal, which is provided at least at one region of an outer circumference of said pin between said first and second openings and at least one of said end surfaces of said pin.

9. The fluid cylinder with the swivel joint according to claim 8, further comprising:

at least one labyrinth groove provided in at least one region of the outer circumferential surface of said pin and the inner circumferential surface of said pin hole between said first and second openings and said at least one first annular seal.

10. The fluid cylinder with the swivel joint according to claim 8, further comprising:

at least one second annular seal which is provided in at least one region in the outer circumference of said pin between at least said one first annular seal and said a least one of said end surfaces of said pin and is fitted onto said pin, at least one third flow passage which is opened in at least one region of the outer circumferential surface of said pin and the inner circumferential surface of said pin hole, between at least said one first annular seal and at least said one second annular seal, and reaches the swivel flow passage, and a check-valve which is provided in at least said one third flow passage and allows only flow of fluid into said swivel flow passage.

11. The fluid cylinder with the swivel joint according to claim 10, further comprising:

a filter detachably attached from an outside at a side of said check-valve, opposite to the swivel flow passage, in said third flow passage.

12. The fluid cylinder with the swivel joint according to claim 6, wherein said relative rotation range is set on a side opposite said piston in said pin hole inner circumferential surface when said second flow passage reaches said chamber at the rod side in cylinder tube.

13. The fluid cylinder with the swivel joint according to claim 12, further comprising:

at least one first annular seal, which is provided at least at one region of an outer circumference of said pin between said first and second openings at least one of said end surfaces of said pin.

14. The fluid cylinder with the swivel joint according to claim 13, further comprising:

at least one labyrinth groove provided in at least one region of the outer circumferential surface of said pin and the inner circumferential surface of said pin hole between said first and second openings and said at least one first annular seal.

15. The fluid cylinder with the swivel joint according to claim 13, further comprising:

at least one second annular seal which is provided in at least one region in the outer circumference of said pin between at least said one first annular seal and said at least one of said end surfaces of said pin and is fitted onto said pin, at least one third flow passage which is opened in at least one region of the outer circumferential surface of said pin and the inner circumferential surface of said pin hole, between at least said one first annular seal and at least said one second annular seal, and reaches the swivel flow passage, and a check-valve which is provided in at least said one third flow passage and allows only flow of fluid into said swivel flow passage.

16. The fluid cylinder with the swivel joint according to claim 15, further comprising:

a filter detachably attached from an outside at a side of said check-valve, opposite to the swivel flow passage, in said third flow passage.

17. The fluid cylinder with the swivel joint according to claim 6, further comprising:

at least one first annular seal, which is provided at least at one region of an outer circumference of said pin between said first and second openings and at least one of said end surfaces of said pin.

18. The fluid cylinder with the swivel joint according to claim 17, further comprising:

at least one labyrinth groove provided in at least one region of the outer circumferential surface of said pin and the inner circumferential surface of said pin hole between said first and second openings and said at least one first annular seal.

19. The fluid cylinder with the swivel joint according to claim 17, further comprising:

at least one second annular seal which is provided in at least one region in the outer circumference of said pin between at least said one first annular seal and said at least one of said end surfaces of said pin and is fitted onto said pin, at least one third flow passage which is opened in at least one region of he outer circumferential surface of said pin and the inner circumferential surface of said pin hole, between at least said one first annular seal and at least said one second annular seal, and reaches the swivel flow passage, and a check valve which is provided in at least said one third flow passage allows only flow of fluid into said swivel flow passage.

20. The fluid cylinder with the swivel joint according to claim 19, further comprising:

a filter detachably attached from an outside at a side of said check-valve, opposite to the swivel flow passage, in said third flow passage.

* * * * *

UNITED STATES PATENT AND TRADEMARK OFFICE
CERTIFICATE OF CORRECTION

PATENT NO. : 6,948,417 B2
DATED : September 27, 2005
INVENTOR(S) : Tatsuya Futami It is certified that error appears in the above-identified patent and that said Letters Patent is hereby corrected as shown below:

Column 17,
Line 24, "said cylinder comprising a pin hole" should be read -- said cylinder comprising a pin hole in said rod front end portion --.

Column 18,
Line 20, "from" should read -- front --.

Column 19,
Line 36, "is set on side opposite" should read -- is set on a surface at a side opposite --.

Column 20,
Line 42, "he" should be read -- the --.

Signed and Sealed this

Twenty-eighth Day of March, 2006

JON W. DUDAS
*Director of the United States Patent and Trademark Office*